United States Patent [19]
Akhtar

[11] Patent Number: 5,096,561
[45] Date of Patent: Mar. 17, 1992

[54] THIN FILM IONIC CONDUCTORS, METHODS AND DEVICES

[76] Inventor: Masud Akhtar, 8 Wexford Dr., Lawrenceville, N.J. 08648

[21] Appl. No.: 546,897

[22] Filed: Jul. 2, 1990

[51] Int. Cl.$^5$ .............................................. C25B 13/08
[52] U.S. Cl. ..................................... 204/296; 521/27; 429/192
[58] Field of Search ............... 204/295, 296; 252/62.2; 428/308.4, 473.5; 429/30, 33, 192; 521/27

[56] References Cited

U.S. PATENT DOCUMENTS 4,720,334  1/1988  DuBois et al. .................... 204/98
4,767,645  8/1988  Linder et al. ..................... 427/386

Primary Examiner—John Niebling
Assistant Examiner—Kathryn Gorgas
Attorney, Agent, or Firm—George E. Kersey

[57] ABSTRACT

Thin-film ionic conduction by cross-linking a polymer matrix, such as poly(ethyleneimine), with a halocarbon based diepoxide or divinyl to produce composite compounds with selective ionic conductivity and ion transport properties that can be controlled by the addition of metallic salts or protonic acids.

16 Claims, No Drawings

THIN FILM IONIC CONDUCTORS, METHODS AND DEVICES

BACKGROUND OF THE INVENTION

This invention relates to polymeric ionic conduction and more particularly to polymeric ionic conduction in electrolytes or separators for electrochemical processes and devices.

In a wide variety of electrochemical applications, it is desirable to employ solid-state electrolytes having preselected ionic conductivities at ambient temperatures. Solid electrolytes having this characteristic are generally prepared by complexing ionic salts with polymers such as poly(ethyleneoxide) and poly(ethyleneimine). These electrolytes have low ionic conductivities at room temperatures because of the formation of crystallites. In addition the ambient temperature conductivities are low because phase separation and material deformation take place at temperatures in the range of 60°–80° C.

Another type of solid polymeric electrolyte is derived from proton conducting materials such as polystyrene sulfonic acid, polyperfluorosulfonic acid, and poly-2-acrylamido-2-methylpropane sulfonic acid. Protonic conductivity associated with these materials requires the presence of small amounts of water. This limits the reliability and utility of such conductivity, besides being corrosive in nature due to the presence of moisture.

Accordingly, it is an object of the invention to provide solid-state ion conducting electrolytes which can operate in a relatively wide temperature range extending from below 0° C. to as low as −10, and above 100 to as high as 200° C. A related object is to realize such electrolytes with conductivities which are not limited by material phase changes or absorbed molecules of water or solvent.

Another object of the invention to provide amorphous polymeric ionic conductors with improved conductivity and stability for electrochemical processes over a wide temperature range.

A further object of the invention is to provide polymeric selective ionic conductors in the form of flexible, non-brittle, and free standing thin films.

Yet another object of the invention is to provide simple processes for the production of polymeric ion conductors which are moldable, and can be coated or laminated to general substrates in transparent or opaque forms.

SUMMARY OF THE INVENTION

In addition, the invention provides thin film polymeric electrolyte prepared by the reaction of an organic polymeric matrix with a compound having a halocarbon backbone. For an amorphous proton conducting electrolyte, the polymeric matrix is a poly(ethylene reactive compound and the halocarbon compound is a halogenated diolefin. The polymer can be branched and the diolefin can be 3,3,4,4-tetrafluorohexa-5,5-diene. The organic polymeric matrix can include branched or linear polyethyleneimines of molecular weights in the range from about 400 to 100,000 with a plurality of reaction sites.

An amorphous proton conducting electrolyte can be prepared in the presence of a protonic acid catalyst. An amorphous proton conducting electrolyte can also be prepared by the reaction of a branched polyethyleneimine of molecular weight about 50,000 with a fluorocarbon-backbone diepoxide in the presence of a protonic acid catalyst.

For an electrolyte in accordance with the invention, the reaction is speeded by a protonic acid catalyst selected from the class consisting of phosphoric acid, vinyl sulfonic acid, hydrochloric acid, 2-acrylamido-2-methylpropane sulfonic acid, and sulfuric acid.

The electrolyte of the invention also can be prepared by the reaction of a branched polyethyleneimine of molecular weight about 50,000 with a cyclic or linear phosphonitrillic fluoride or chloride.

The polymeric electrolyte can be prepared by reaction with a fluorocarbon backboned diepoxide in the presence of a metallic salt, which can be selected from Group I of the Periodic Table, including lithium salts; Group II of the Periodic Table, including zinc salts; and group IV of the Periodic Table, including lead salts.

The organic polymeric matrix can contain at least one polyetheramine of a molecular weight about 2000, in the range from about 100 to 5000.

A transparent membrane electrolyte is obtained by heating branched polyethyleneimine of molecular weight 50,000 with diepoxides having fluorocarbon backbones, is stable in air up to temperatures of 300° C. and in acids and alkalies up to temperatures of 100° C.

A membrane according to the invention transports protons and anions when in contact with aqueous solutions containing acids or metallic salts, but does not transport metallic cations, and acts only as a lithium ion solid state conductor when organolithium compounds are included in its preparation; and only as an anionic solid state conductor when alkyl halides are included in its preparation.

A flame retardant elastomer is prepared by the reaction of branched polyethyleneimine with phosphonitrillic fluoride.

An electrically conducting membrane is obtained by heating branched polyethyleneimine of molecular weight of 50,000 with fluorocarbon backboned diepoxides in the presence of zero valent metallic complexes.

A thin film polymeric electrolyte in accordance with the invention is insoluble in water and the constituents are mixed in various ratios according to the desired properties.

In a method of the invention the polymeric electrolyte can be coated over various inorganic or organic support substrates and several additives can be included to act as binders, stabilizers or to modify specific properties.

For an optoelectric composite, electrically active organic polymers or metal oxides are mixed with the constituents. A membrane of the invention can be used as a antifouling paint, as an epoxy, as a fabric, or as a multipurpose filter.

In a method of the invention for preparing a thin-film polymeric electrolyte, an organic polymeric matrix is reacted with a compound having a halocarbon backbone.

In accomplishing the foregoing and related objects, ionic conductors are prepared from organic polymeric matrix materials, such as poly(reactive) compounds, and compounds having halocarbon backbones.

Suitable poly(reactive) compounds possess oxygen and/or nitrogen atoms. Poly(ethylene reactive) and poly(acryl reactive) compounds are particularly suitable and include ethyleneimines and amines;

ethyleneoxides; ethylenesulfides and acrylamids and imids.

The halocarbon compounds include mono and diepoxides, mono and divinyls, and mono and dianhydrides. They serve as cross-linking agents and impart special properties to the composite material. These properties include flexibility, improved chemical and environmental inertness, water resistance and insolubility, and transparency, as well as related halocarbon surface properties.

When the composites contain nitrogen or oxygen electron donor atoms, they make selective ion conducting adducts with salts, acids, or alkyl halides to form cationic, protonic, or anionic transport materials.

Illustrative cross-linking agents for linear or branched polymeric matrices include epoxides and vinyls. With poly(ethyleneimines) diepoxides and divinyls having fluorocarbon backbones are particularly suitable. For polyetheramines, the cross-linking agents are diepoxides with fluorocarbon backbones.

Further aspects of the invention will be apparent to those of ordinary skill in the art from the following detailed description.

DETAILED DESCRIPTION

The following series of processes and products in accordance with the invention are presented below by way of illustration only, and are not to be construed as limiting the scope and applicability of the invention.

A. Composites Prepared Using Acid Catalysts

When protonic acids are added to aqueous or nonaqueous solutions of poly(ethyleneimine), they produce active electronic centers on the nitrogen atoms of the imine to catalyze addition reactions with unsaturated molecules having a pH in the range from about 1-6. Such reactions can take place without catalysis, but the reactions are promoted by catalysis.

1. Divinyl Cross-Linking With Sulfonic Acid Catalysis

Vinyl sulfonic acid solution in methanol is added slowly to methanol solution of a branched poly(ethyleneimine),(BPEI) of structural formula (1), below:

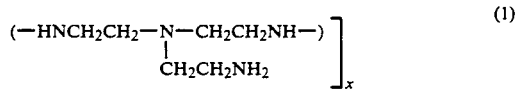

(1)

of molecular weight about 50,000 to a pH of 2.

Then a divinyl fluorocarbon such as a solution in methanol of 3,3,4,4,-tetrafluorohexa-1,5-diene ($CH_2$=$CHCF_2CF_2CH$=$CH_2$), illustratively a 2 weight percent relative to the amount of BPEI, is added and the mixture stirred.

The mixture starts becoming viscous after thirty minutes. Flexible, transparent, and thin films can be cast or coated from this mixture over a variety of substrates.

A film of 0.5 mm thickness, dried at 120° C. had a room temperature conductivity of $5 \times 10^{-5}$ ohm$^{-1}$ cm$^{-1}$. The protonic conductivity of the film was confirmed by using it as an electrolyte in a cathodically colorable tungsten oxide electrochromic device according to reaction (2), below:

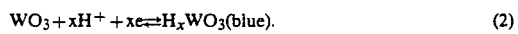

(2)

Furthermore, a catalytic reaction of carbon dioxide and hydrogen across this film produces methanol when current is passed between two platinum electrodes.

In a further illustration of the above process, vinyl sulfonic acid was replaced by 2-acrylamido-2-methylpropanesulfonic acid ($CH_2$=$CHC(O)N(H)C(CH_3)_2CH_2SO_3H$) and the resulting films were dried at 200° C. When two platinum metal electrodes were placed in a cell across such a film, an electrocatalytic reaction of oxygen and hydrogen took place to produce water in the cell and electric current in an external circuit.

Before solidification, the electrolyte compositions can be coated over porous substrates such as polypropylene to provide bipolar membranes which allow the passage of cations or anions as desired in cells with liquid electrolytes.

B. Composites Prepared by Diepoxide Cross-Linking

Diepoxides for use as cross-linkers can be prepared by reacting epichlorohydrin with halocarbon compounds such as the following:

(a) 1,3-bis(1,1,1,3,3,3-hexafluoro-2-hydroxypropyl) benzene, shown structurally in formula (3), below:

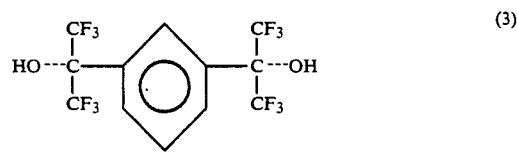

(3)

(b) 4,4'-bis(1,1,1,3,3,3-hexafluoro-2-hydroxypropyl)-diphenyl ether, of formula (4), below:

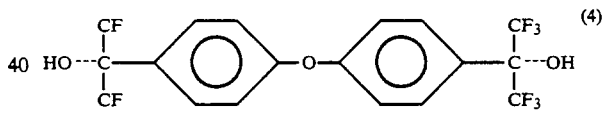

(4)

(c) 2,2-bis(4-hydroxyphenyl)hexafluoropropane, of formula (5), below:

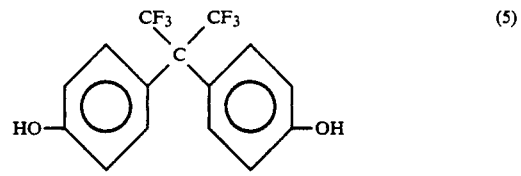

(5)

To illustrate diepoxide cross-linking in accordance with the invention, the fluorocarbon benzene of formula (3) above is combined with epichlorhydrin according to reaction (6), below:

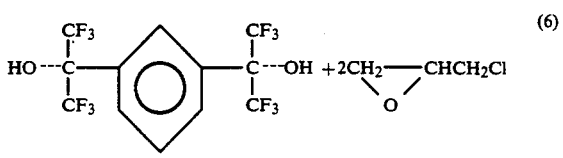

(6)

The reaction (6) produces the diepoxide result (7), below:

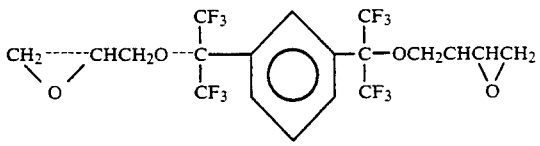

In order to produce a diepoxide composite, a methanol solution of BPEI (formula (1), above) was mixed with a diepoxide (formula (7), above) solution in trifluorotrichloroethane, having a weight ratio of 2:1 and total concentration of 10% by weight.

The mixture was placed in a plastic tray to a depth of one centimeter. After the evaporation of solvent at 30° C., the tray was heated at 60° C. for one hour. A flexible and transparent thin film of 0.4 mm thickness was peeled from the tray.

When the film was used as a separator between cathode and anode compartments of a cell containing acidic ferrous chloride electrolyte, it limited the passage of water across the cell compartments, but allowed only the passage of protons and anions.

When methyl bromide (10% by weight relative to the amount of BPEI) was used in the preparation of the thin film, the resulting dried film possessed anionic conductivity due to the presence of bromide ions in the quaternized composite.

When the diepoxide composite film, prepared as described above from BPEI and diepoxide, was immersed in concentrated hydrochloric acid for twenty minutes and then dried in air at 130° C., the resulting film had a conductivity of $10^{-4}$ ohm$^{-1}$ cm$^{-1}$. This film was used as a proton conducting electrolyte in a nickel hydride battery without any moisture under hydrogen gas pressure to produce the reaction (8), below:

$$1/6\ LaNi_5 + Ni(OH_2 \rightleftharpoons 1/6\ LaNi_5H_6 + NiO(OH) \tag{8}$$

where

La is Lanthanum (Group III B);
Ni is nickel;
O is oxygen and H is hydrogen.

The battery had an open-circuit voltage (Voc) of 0.9 Volts (V) and was charged and discharged between 1.5 V and 0.8 V five thousand times without any degradation.

During the diepoxide composite film production process described above, phosphotungstic acid solution in methanol (0.8 weight percent relative to BPEI) was added to the reaction mixture. The resulting film was transparent. This film underwent several thousand reduction-oxidation cycles with cathodic coloring in accordance with equation (9), below:

$$WO_3 + xA^+ + xe \rightleftharpoons A_xWO_3 \tag{9}$$

where

W is tungsten;
A is a cation such as Li$^+$, or H$^+$, supplied by a separate solid state electrolyte in an electrochromic device.

Similarly, an anodically coloring composite film was obtained when phosphotungstic acid was replaced by polyaniline solution in acetic acid in the preparation of the above film.

The film produced as described above was placed in concentrated sulfuric acid and then dried and placed between lead and lead oxide plates. A cell with a Voc = 1.5 V and a short-circuit current (Isc) = 70 A was produced.

C. Composites prepared from polyetheramines

Equimolar quantities of polyetheramine, in accordance with formula (10), below:

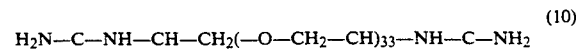

and diepoxide yield transparent films from hot (60° C.) solutions in 2-chloro-1,1,2-trifluoroethyl ethyl ether cast in plastic or glass trays.

When such polyetheramine films are cast in the presence of lithium trifluoromethanesulfonate (10% by weight relative to the organic film), Li$^+$conducting films with a conductivity of $10^{-6}$ ohm$^{-1}$ cm$^{-1}$ are obtained.

These films were used as an electrolyte for a solid state polyaniline-lithium battery, and also for polyaniline-tungsten oxide electrochromic device.

D. Composites Prepared from Phosphonitrillic Halides

When mixtures of branched poly(ethyleneimine) of molecular weight of 50,000 are heated with phosphonitrillic fluoride (—N=PF$_2$—)$_3$, (2% by weight) at a temperature of 200°–250° C., a flame resistant moldable material is obtained. It can be cast into various shapes as rubber for several applications such as heat resistant elastomers.

The foregoing examples are for illustration only, and other adaptations of the invention will be readily apparent to those of ordinary skill in the art.

What is claimed is:

1. A thin film polymeric electrolyte prepared by a reaction consisting of combining:
    a. an organic polymeric matrix selected from the class consisting of polyethyleneamines; polyethyleneoxides; polyethylenesulfides; polyacrylamids; polyacrylimids; polyethyleneimines and polyetheramines with
    b. a compound having a halocarbon backbone.

2. A thin film polymeric electrolyte of claim 1 wherein said reaction is speeded by a protonic acid catalyst selected from the class consisting of phosphoric acid, vinyl sulfonic acid, hydrochloric acid, 2-acrylamido-2-methylpropane sulfonic acid, and sulfuric acid.

3. An electrolyte of claim 1, wherein the organic polymeric matrix includes branched or linear polyethyleneimines of molecular weights in the range from about 400 to 100,000 with a plurality of reaction sites.

4. An electrolyte of claim 1 wherein the polymeric electrolyte is prepared by reaction with a fluorocarbon backboned diepoxide in a metallic salt.

5. An electrolyte of claim 4 wherein said metallic salt is a lithium salt.

6. The electrolyte of claim 4 wherein the metallic salt is lead.

7. A thin film polymeric electrolyte forming a transparent membrane electrolyte of claim 1 which is obtained by heating branched polyethyleneimine with diepoxides having fluorocarbon backbones; and is stable in air up to temperatures of 300° C. and in acids and alkalies up to temperatures of 100° C.

8. A thin film polymeric electrolyte of claim 7 which transports protons and anions when in contact with aqueous solutions containing acids or metallic salts, but does not transport metallic cations.

9. The thin film polymeric electrolyte of claim 8 which acts only as a lithium ion solid state conductor when organolithium compounds are included in its preparation.

10. The thin film polymeric electrolyte of claim 8 which acts only as an anionic solid state conductor when alkyl halides are included in its preparation.

11. A thin film polymeric electrolyte of claim 1 which is obtained by heating branched polyethyleneimine with a fluorocarbon backboned diepoxide and a metallic complex.

12. A thin film polymeric electrolyte of claim 1 which is insoluble in water.

13. A thin film polymeric electrolyte of claim 1 wherein the said polymeric electrolyte is coated over a nonelectrolytic support substrate.

14. The electrolyte of claim 1 wherein the polymeric matrix is reacted with an aliphatic fluorocarbon.

15. A thin film polymeric electrolyte for amorphous proton conduction which is prepared by the reaction of a branched polyethyleneimine with a fluorocarbon-backbone diepoxide in a protonic acid catalyst.

16. An electrolyte of claim 15 which is prepared by the reaction of a branched polyethyleneimine of molecular weight about 50,000 with a cyclic or linear phosphonitrillic fluoride or chloride.

* * * * *